United States Patent [19]

Keiser

[11] 3,959,597

[45] May 25, 1976

[54] DELAY LINE TIME COMPRESSOR AND EXPANDER

[76] Inventor: Bernhard E. Keiser, 2046 Carrhill Road, Vienna, Va. 22180

[22] Filed: Apr. 15, 1975

[21] Appl. No.: 568,253

[52] U.S. Cl. ........................................ 179/15.55 T
[51] Int. Cl.² .......................................... H04B 1/66
[58] Field of Search ............... 179/15.55 T, 15.55 R

[56] References Cited
UNITED STATES PATENTS

| | | | |
|---|---|---|---|
| 3,763,328 | 10/1973 | Lester | 179/15.55 T |
| 3,838,218 | 9/1974 | Pfund | 179/15.55 T |
| 3,846,827 | 11/1974 | Eppler | 179/15.55 T |
| 3,855,425 | 12/1974 | Kerser | 179/15.55 T |

Primary Examiner—Kathleen H. Claffy
Assistant Examiner—E. Matt Kemeny

[57] ABSTRACT

This invention relates to an improved system for changing the bandwidth of an intelligence-bearing electrical signal so that it can be transmitted within said changed bandwidth and to a counterpart system for changing the bandwidth, following transmission, so that a good replica of the original signal is obtained at a receiving terminal. The bandwidth compression and expansion are obtained through time-delay expansion and compression. This invention uses the fact that the time delay characteristics of a charge-coupled device is a function of the clocking frequency. The desired time delay variation can be achieved by varying this clocking frequency correspondingly. A single delay line, with a sawtooth variation of clock frequency, is a feature of the invention.

3 Claims, 7 Drawing Figures

A. BEFORE BANDWIDTH COMPRESSION

B. AFTER BANDWIDTH COMPRESSION

DELAY LINE TIME COMPRESSOR AND EXPANDER

RELATED APPLICATIONS

There are no related applications. The present application describes an invention which is an improvement upon the one described in U.S. Pat. No. 3,855,425, issued Dec. 17, 1974.

BRIEF SUMMARY OF THE INVENTION

This invention belongs to the class of devices known as delay line time compressors. Prior to this invention such devices used one of the following means of operation: (1) A long chain of all-pass networks, (2) a fixed acoustic delay line and sampling process, (3) conversion to digital form and/or pulse regeneration and gating, (4) mechanical commutation, (5) cathode-ray tube techniques, (6) delay lines with variable reactance elements. Other such devices were built for special purposes and required the artificial reconstruction of speech, or split channel operation, or operated only on short bursts of energy. The disadvantages of the foregoing prior embodiments are that (1) a long chain of all-pass networks is costly and bulky, (2) acoustic delay lines require the use of acoustic transducers, with their sensitivity to mechanical vibrations which can interfere with the operation of the device, resulting in unwanted noise, (3) the use of pulse circuits requires input conversion to binary form with its attendant bandwidth increase, or else highly accurate timing, and is subject to performance deterioration if timing at the sending and receiving ends is not properly synchronized, (4) mechanical commutators and tape players with moving heads, etc., are limited in their high frequency response, or may require difficult-to-adjust synchronous operations, (5) the use of cathode-ray tubes results in bulky packaging and in performance that is sensitive to cathode-ray screen characteristics or electrode placement or both, (6) delay lines with variable reactance elements are subject to performance variations from time to time since all reactance elements must vary together in a prescribed fashion or else the delay variation per element is very small relative to the total delay, thus requiring an excessive line length.

The invention described herein operates over a broad frequency band on all spectral components of the input uniformly. Specially selected samples of the input are not used, the samples simply being taken periodically. It does not require the artificial reconstruction of the input based on its special characteristics, such as speech elements; it operates on continuous signals as well as on short bursts; and it does not require split-band operation. Furthermore, it does not require the reconstruction of a frequency-domain replica of the original signal in order to provide continuity from one sampled period to the next.

An object of this invention is to provide a straight forward method for compressing the bandwidth of continuous (analog) signals that contain a high degree of redundancy from an information theory viewpoint. A further object of this invention is to compress the bandwidth of continuous signals such that the wave shape is preserved during each sampling period.

This invention uses a delay line consisting of a ladder of charge-coupled devices which have the property that their attenuation is constant with frequency but the transmission time through them is proportional to the clocking frequency applied to them. Thus the delay is inversely proportional to this clocking frequency. Increasing the delay stretches the waveform in the time domain, while reducing the delay compresses the waveform in the time domain, thus expanding its bandwidth. The delay is varied by a clocking frequency from a voltage-controlled oscillator (VCO) that is swept by a sawtooth generator. In the bandwidth expansion process, moreover, some means of re-introducing the redundancy into the signal must be provided. For this purpose, a charge-coupled device having a fixed clocking frequency is used. The clocking waveform is a sine wave whose frequency equals that of the sawtooth used for the cycle compressor, as distinguished from the VCO-generated variable frequency, whose instantaneous value is varied by application of the sawtooth.

In the variable delay networks, a hold and compare combining circuit provides for the transitions from one waveform period to another at the end of each delay sweep without the sudden jumps that otherwise would broaden the bandwidth needlessly.

DESCRIPTION OF THE DRAWINGS

In the accompanying drawings, forming a part of this specification and showing, for purposes of exemplification, preferred forms of this invention without limiting the claimed inventions to such illustrative instances:

DETAILED DESCRIPTION

Figure 1:
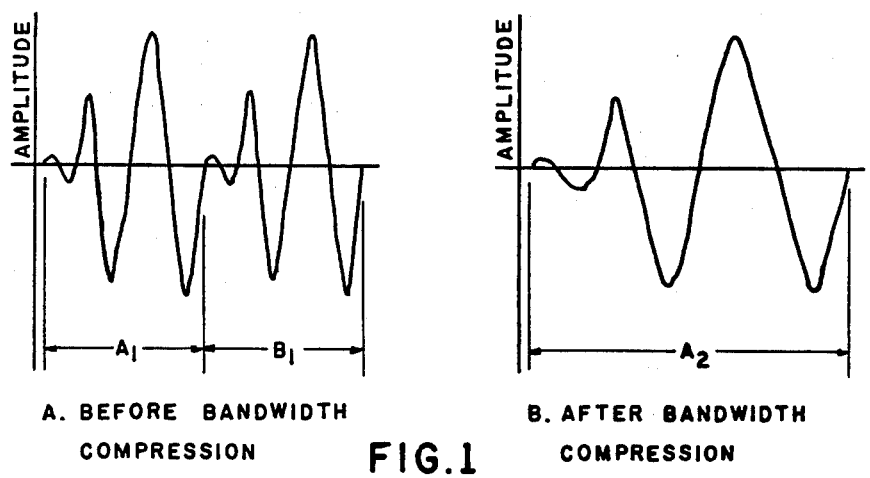
FIG. 1 illustrates the principle of time-domain bandwidth compression, showing a waveform that is expanded by 2:1 in the time domain.

With reference to FIG. 1, a representative segment of an input signal is selected such that the duration of this segment is at least as long as the period of the lowest frequency component of the input signal. For example, if the input signal is a speech waveform occupying the band 300 to 3,000 hz, the duration of the segment should be at least 3.3 msec.

Thus, Let $f_L$ = lowest frequency in spectrum to be compressed
$S$ = sampling rate
$m$ = bandwidth compression factor = time expansion factor Then $$m = f_L/S \qquad (1)$$

In this example, if $m = 15$, the 300 to 3,000 hz spectrum is compressed to 20 to 200 hz.

A study of FIG. 1 shows that waveform (B) can be produced from waveform (A) by subjecting (A) to a variable delay, $\tau$, that starts at zero and equals ($A_2 - A_1$) at the end of the first period of the waveform displayed there. Thus, $$m = 1 + (d\tau/dt) \qquad (2)$$

If $m$ is an integer, completion of the output cycle will occur at the start of an input cycle, provided also that the effective period of the input has not changed.

Since the input is assumed to be an information-bearing waveform with redundancies, however, no "period" generally can be defined for the input. Consequently, the time compressor takes samples based on a period established in advance so that the resulting samples are assumed to be representative of the entire input.

With respect to the voice transmission of the above example, the 300 to 3,000 hz spectrum is sampled 20 times per second. Each sample is the length of a single 300 hz cycle. Thus higher spectral components (up to 3,000 hz) may contain up to 10 cycles per sample. From one sample to another, no phase coherency can be expected. If it exists, it will not be preserved beyond an input duration equal to the sample length (3.3 msec. in the example). Where phase coherency must be preserved, such as for video transmission, the sampling rate can be made equal to the horizontal scan rate. Other examples can be devised for other types of information-bearing signals.

With reference again to FIG. 1, completion of the output segment must be accompanied by a return of the time delay, $\tau$, to zero, or its minimum value, so that it can operate upon the next input cycle. Furthermore, completion of the input segment must cause a shut-off of the input until the output segment is complete. During the time delay flyback time, a hold circuit operates to keep the output value constant until the new segment starts coming out, at which time a comparison circuit switches to the new segment at an instant when the output values coincide. This prevents the generation of a step function with its out-of-band components.

The maximum time delay reached can be pre-set based upon the time expander design and the waveform being processed for transmission. Conceptually, the variable time delay system is comparable to a telescoped cylinder or pipe that is lengthened as fluid flow occurs through it, and then is suddenly shortened. (Provision must be made to assure that the pipe has been emptied of fluid when it is suddenly shortened; this corresponds to the requirement that the input to the delay line be cut off in advance of the end of each sweep cycle so that the line will be empty soon enough.)

For bandwidth expansion, the delay system must operate in reverse, i.e., the delay is maximum at the start of a cycle and drops to minimum. In this case, provision must then be made to repeat the input cycle $m$ times to provide for correct bandwidth expansion.

Figure 3A:
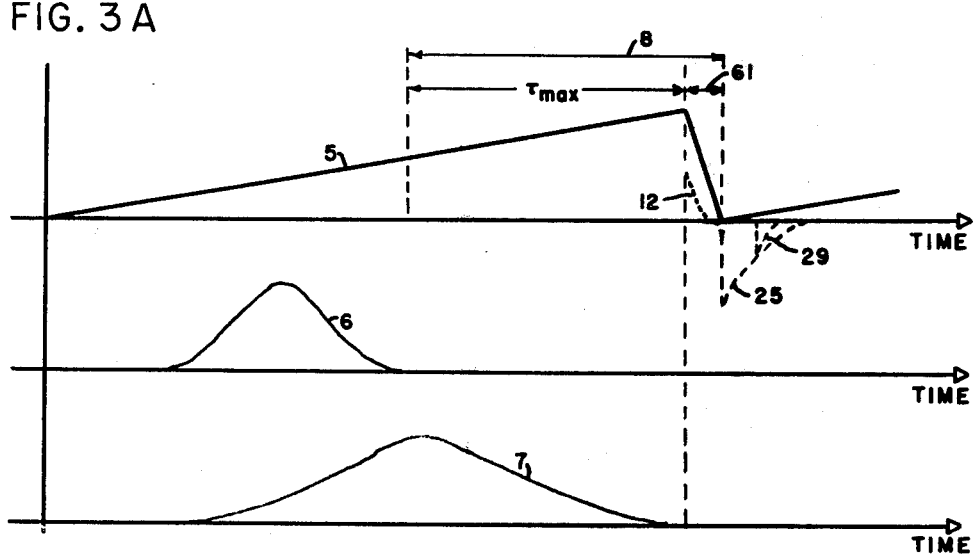
FIG. 3 is a timing diagram illustrating the operation of the system, with FIG. 3A applicable to the time expander and FIG. 3B applicable to the time compressor.
Figure 3B:
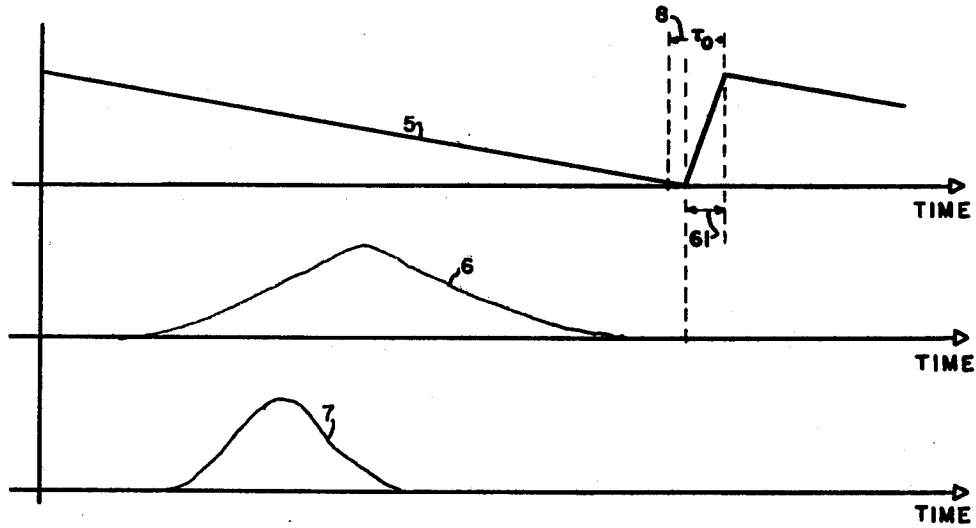
Figure 2:
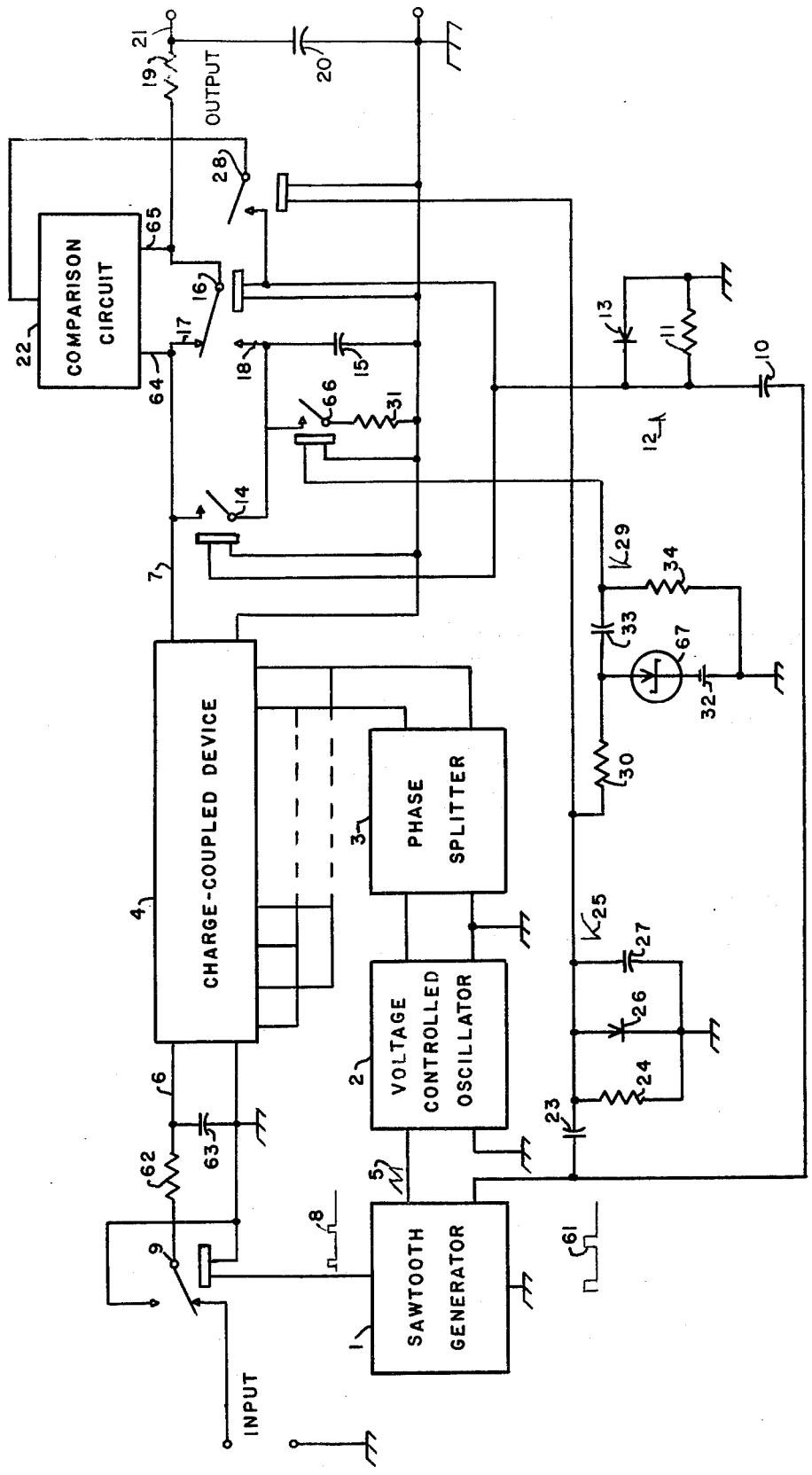
FIG. 2 is a block diagram illustrating the elements that may be used with the variable delay charge-coupled device in minimizing irregularities during the flyback period, when the time delay returns to its initial value.

A block diagram of a variable delay network is shown in FIG. 2. This network can be made to function either as a time compressor or a time expander, depending on whether the sawtooth generator 1, voltage-controlled oscillator 2, and phase splitter 3 cause the delay through charge-coupled device 4 to increase or decrease. With reference to both FIG. 2 and FIG. 3, the operation of the variable-delay network is as follows:

Sawtooth generator 1 is adjusted so that its rate is the desired sampling rate, S. Its main output is waveform 5. Waveform 5 is used to produce a swept frequency output from voltage controlled oscillator 2, and, in multiphase form, from phase splitter 3. Two phases are depicted in FIG. 2 for illustrative purposes. A different number of phases could be used. The outputs of phase splitter 3 clock the charge-coupled device, 4, thus causing the charge packet representative of its input, 6, to move along its length toward its output, 7, at a rate dependent upon the clocking frequency. (For a charge-coupled device, the delay equals the number of sections divided by the clocking frequency.)

For a time expander (bandwidth compressor), the delay starts at its minimum value, corresponding to maximum clocking frequency; the delay then increases linearly as a result of a decrease in clocking frequency. For a time compressor (bandwidth expander) the delay starts at its maximum value, corresponding to minimum clocking frequency; the delay then decreases linearly as a result of an increase in clocking frequency.

Prior to the time when waveform 5 reaches its maximum value, a circuit (e.g., one using a zener diode), not shown, within the sawtooth generator, 1, produces waveform 8 on a separate output lead. Waveform 8 opens solid-state relay 9 and holds it open until the retrace of waveform 5 has been completed. Resistor 62 and capacitor 63 smooth the transients caused by opening and closing relay 9. As can be seen from FIG. 3A, for the time expander, waveform 8 starts at a time $\tau_{max}$ (maximum delay of charge-coupled device 4) prior to the time when the sawtooth, 5, reaches its maximum value, (FIG. 3B applies correspondingly to the time compressor.) Consequently, charge-coupled device 4 is empty of charge when the delay flyback process occurs. During the delay flyback time, waveform 61, which can be derived from waveform 5, is provided by sawtooth generator 1. Waveform 61 is differentiated by capacitor 10 and resistor 11 to produce waveform 12, which is maintained positive with respect to ground by diode 13.

In the time expander, waveform 12 causes solid-state relay 14 to close briefly, thus charging capacitor 15 to the instantaneous output level on line 7. Waveform 12 also causes make-before-break relay 16 to move from its normal resting contact 17 to contact 18. The voltage residing on capacitor 15 now is the system output, while the delay flyback process is occurring. (Standard provisions for preventing the charge from draining from capacitor 15 will be obvious to those skilled in the art.) Resistor 19 and capacitor 20 serve to suppress any switching transients that may have reached the output terminal 21 during the foregoing and following switching processes.

When relay 16's arm has moved to contact 18, electronic comparison circuit 22 (high input impedance) initially registers equal inputs on leads 64 and 65, but this condition soon ceases. When the delay retrace has ended, the value of waveform 8 returns to zero, thus causing relay 9 to return to its normally closed position, which allows the input again to flow into charge-coupled device 4 at input lead 6. Since waveform 61 also drops to zero when waveform 8 does (see FIG. 3), waveform 61 can be differentiated by capacitor 23 and resistor 24 to produce waveform 25 across diode 26 and capacitor 27. Waveform 25 causes relay 28 (normally open) to close, thus allowing the output of comparison circuit 22 to hold relay 16's arm on contact 18 until the output 7 from charge-coupled device 4 is equal again to the voltage being held on capacitor 15, whereupon the comparison circuit output causes relay 16's arm to return to contact 17.

All that remains to be done now is the discharging of capacitor 15 so that it will be ready to perform its function again without undesirable transients. This is accomplished by waveform 29, which is derived from pulse 25 by a circuit consisting of resistor 30, zener diode 67, bias cell 32, capacitor 33, and resistor 34. Waveform 29 causes solid-state relay 66 to close momentarily, thus discharging capacitor 15 through resistor 31.

In the delay-line time compressor capacitor 10 is replaced by a short circuit and components 11 and 13 are omitted. Thus waveform 12 is replaced by waveform 61 which causes solid-state relay 14 to close during the timedelay flyback, but capacitor 15 is replaced by a short circuit, and switch 66 and resistor 31 are not used. Consequently, any residual output of charge-coupled device 4 is discharged. Waveform 61 (in place of waveform 12 in FIG. 2) also causes solid state relay 16's arm to move to contact 18, thus maintaining zero output during the time-delay flyback of charge-coupled device 4. Components 23, 24, 26, 27, 28 30, 31, 32, 33, 34 and 67 are also omitted in the time compressor. Consequently, waveforms 25 and 29 do not exist. The comparison circuit 22 is arranged so that a difference on its input leads, 64 and 65, causes an output that moves the arm of solid-state relay 16 from contact 18 back to contact 17, whereupon the output 7 of charge-coupled device 4 is again connected through resistor 19 to output terminal 21.

Note that the time delays of all sections of charge-coupled device 4 are controlled simultaneously by virtue of the same clocking frequency being applied to all sections at the same time. Relations among the various operational parameters of the variable delay line are as follows:

Let
$N$ = number of sections of charge-coupled device
$R$ = rate at which line delay changes (seconds/second)
$f_H$ = highest input frequency to be transmitted
$f_L$ = lowest input frequency to be transmitted
$f_{c\ min}$ = minimum variable delay line clocking frequency
$f_{c\ max}$ = maximum variable delay line clocking frequency
$m$ = bandwidth compression factor = time expansion factor
$\tau$ = delay through charge-coupled device
$\tau_o$ = minimum delay through charge-coupled device
$S$ = rate at which input waveform is sampled.

The required number of sections, $N$, can be determined from the fact that $$\tau_{max} = (m-1)/f_L + \tau_o \quad (3)$$

where $$\tau_o = N/f_{c\ max} \quad (4)$$

The minimum clocking frequency should be well above $f_H$ so that any inadvertent leakage of the clocking frequency can be filtered from charge-coupled device 4's output 7. Thus $$f_{c\ min} > f_H \quad (5)$$

Then $$N = \tau_{max} f_{c\ min} \quad (6)$$

The maximum clocking frequency, $f_{c\ max}$, is limited by the ability of the circuits to handle and process high pulse repetition rates. Ideally, it should be 20 or more times as great as $f_{c\ min}$ for good delay line utilization. The rate at which the input signal is sampled is $$S \leq f_L/m \quad (7)$$

The rate at which the delay changes is
$$R = (\tau_{max} - \tau_o) S = (m-1)S/f_L \quad (8)$$

As a numerical example, compression of the 300 to 3,000 hz spectrum to 20 to 200 hz requires the following parameters:

$m = 300/20 = 15$
assume $\tau_o = 0.05\ \tau_{max}$. Then $$\tau_{max} - \tau_o = (15-1)/300 = 46.67\ msec.,$$

whereupon $\tau_{max} = 46.67$ msec./0.95 = 49.13 msec. and $\tau_o = 2.46$ msec.
Let
$f_{c\ min} = 3,500$ hz, which means that $N = 49.12 \times 10^{-3} \times 3{,}500 = ^{172}$ sections and $f_{c\ max} = 69,919$ hz, based on Equation (4).

Since charge coupled devices are being manufactured with 256 stages, a two phase device can provide 128 sections. Two such devices in tandem constitute more than enough delay sections. The input sampling rate will be $S \leq 300/15 = 20$ Thus each 3.33 msec. cycle (300 hz) is lengthened to 3.33 + 46.67 = 50.0 msec. (20 hz). For expansion at the receiving and, then, the 50.0 msec. cycle (20 hz) starts thru a 49.12 msec. delay line whose delay drop to 2.46 msec. thus resulting in a 3.33 msec. cycle (300 hz).

At this point, it is well to note that a linear variation of $\tau$ requires a linear variation of $1/f_c$, where $f_c$ is the clocking frequency. The linearity of the variations of $\tau$ or $f_c$ is a function of the design of the Sawtooth Generator, 1, and the Voltage-Controlled Oscillator, 2. With respect to reproduction of the waveform at the receiving end of a communication circuit, the uniformity of delay variation at the transmitting and receiving ends is of much more importance than the actual linearity of variation. Linearity, however, is desirable because it keeps the bandwidth to a minimum by uniformly using the transmission time.

Figure 4:
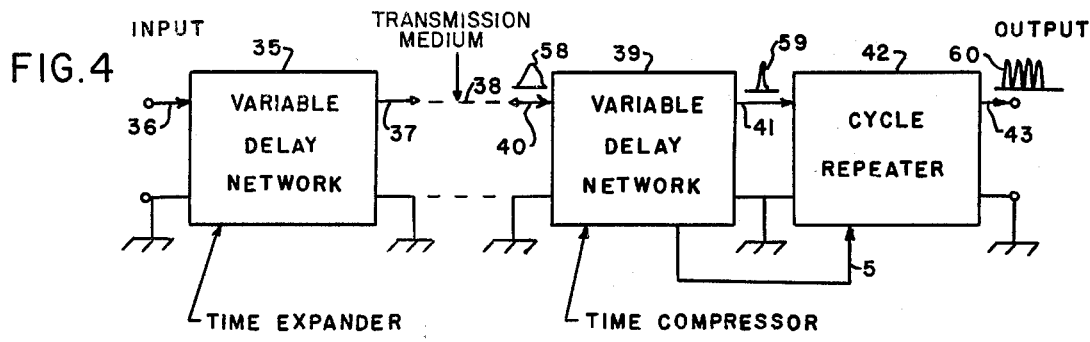
FIG. 4 illustrates a chain of elements comprising a bandwidth compressor, and a bandwidth expander consisting of a variable delay circuit operated as a time compressor, followed by a fixed delay line cycle repeater, which restores the redundant portions of the signal that were eliminated for transmission.

FIG. 4 shows one variable delay network 35 used as a time expander of signal 36 (prior to application of the signal 37 to the transmission medium, 38), and one variable delay network 39 as a time compressor of signal 40 (after receipt of signal 40 from the transmission medium). Variable delay network 39 is vary similar to variable delay network 35 except that, as a bandwidth expander (time compressor) its delay starts at maximum value, decreases smoothly to its minimum value and then rapidly undergoes flyback to maximum value again. Consequently the output circuits of the two vary somewhat, as has been described previously. Since the variable delay network 39 produces output segments on line 41 whose time duration is less than the input segments 40, a cycle repeater 42 is needed so that the output 43 is a good replica of the original input 36.

Figure 5:
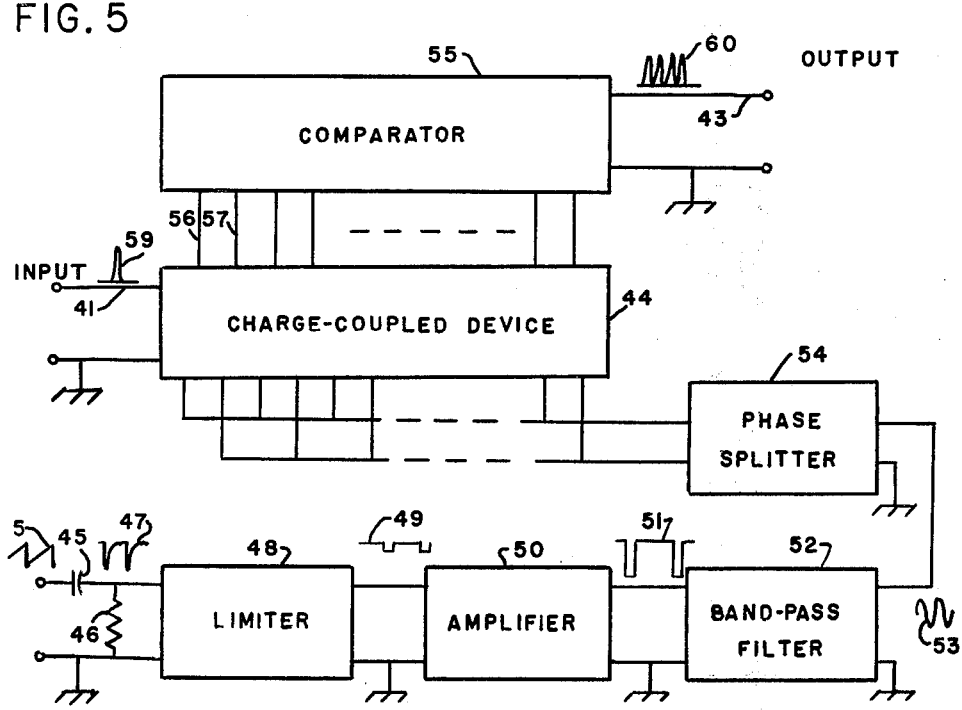
FIG. 5 illustrates a delay line cycle repeater.

Operation of the cycle repeater 42 with the variable delay network 39 is as follows:

In any period of time greater than $m/f_L$, there must be $m$ cycles received for every one transmitted. The variable delay network 39 provides a time compression to each cycle received, but then each compressed cycle must be repeated $m$ times in order for the output to be a good approximation to the original input at the transmitting end. In one embodiment of this invention, the cycle repeater function is accomplished as illustrated in FIG. 5. A charge-coupled device 44 having charge detectors along its length at uniform intervals is operated as a tapped delay line that has essentially a fixed delay determined by the period of the sawtooth generator that is contained within variable delay network 39. With reference to FIG. 2, which applies to variable delay network 39 as well as to variable delay network 35, the output 5 of its sawtooth generator 1 is differentiated (see FIG. 5) by capacitor 45 and resistor 46 to produce waveform 47, which is applied to limiter 48 to produce waveform 49. Waveform 49 is amplified by amplifier 50 to produce waveform 51, which is passed through band-pass filter 52 to produce sine wave 53. Sine wave 53 is then applied to phase splitter 54, which produces the clocking signals that drive charge-coupled device 44 at a rate identical to the period of sawtooth waveform 5, thus providing a delay determined by the essentially fixed period of the sawtooth generator that is contained within variable delay network 39.

A comparator 55 of standard design is included within the cycle repeater 42 to switch among the charge-detector outputs 56, 57, etc., of charge-coupled device 44 to provide a continuous output 43.

Figure 6:
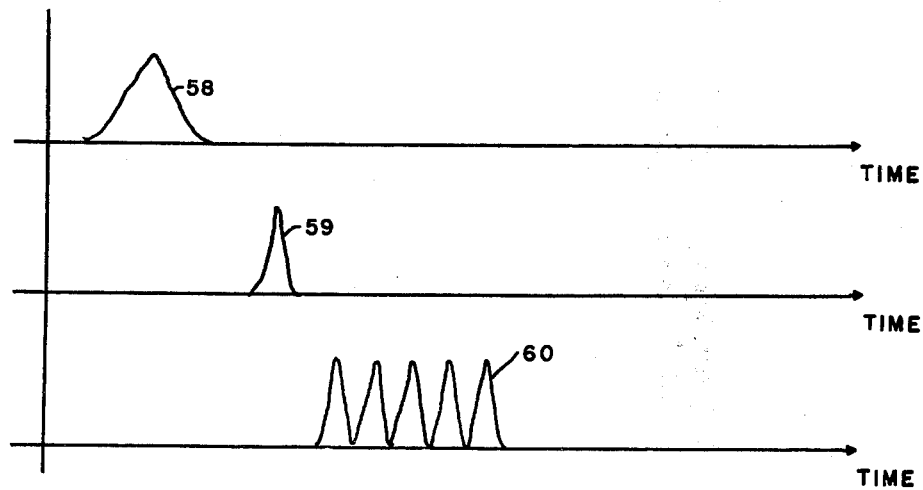
FIG. 6 is a timing diagram illustrating the operation of the cycle repeater with the time compressor.

FIG. 6 further illustrates the operation of the cycle repeater with the time compressor 39. In general, output (56, 57, etc.) will exist from only one charge detector (within 44) at a time because of the time-compressed nature of the output 41 from variable delay network 39. As an example, (see FIG. 4 and FIG. 6) time expanded waveform 58 on input line 40 to variable delay network 39 is time compressed by variable delay network 39 to produce waveform 59 on line 41. Waveform 59, in turn, is repeated by cycle repeater 42 such that its output, the output of comparator 55, is waveform 60 on line 43.

In summary, the operation of the cycle repeater is as follows:

The charge-coupled device 44 has taps (56, 57, etc.), from which replicas of the input waveform 59 on line 41, delayed by various amounts, are obtained. These outputs, segments of the original input, are combined in comparator 55, which selects one tap output segment after another at instants when these segments are equal in amplitude. These output segments come from adjacent delay line taps in sequence. The taps are all equally spaced; their number is equal to the maximum compression ratio. The number of taps used equals the actual compression ratio; the first m taps are always used. In general, output will exist from only one tap at a time because of the nature of the output from the variable delay network 39. As an example, waveform 58 at the input 40 to variable delay network 39 is time compressed such that the output of network 39 is waveform 59 on line 41. Waveform 59, in turn, is repeated by cycle repeater 42 such that its output, 60, on line 43, is a good replica of the original input on line 36 at the transmitting end of the system.

In general, the time compressor (at the receiving end) need not operate in synchronism with the time expander (at the transmitting end).

What is claimed is:

1. A delay line time expander and a delay line time compressor for compressing an information-bearing waveform into a narrow bandwidth, and subsequently expanding it to the original bandwidth, comprising:
   a delay line time expander which requires only a time expansion means and which consists of:
      a first charge-coupled device or a fist tandem combination of charge-coupled devices clocked as a first delay line at a variable rate governed by the output of a first sawtooth waveform generator;
      a first switch for gating said information-bearing waveform to said first charge-coupled device or said first tandem combination of charge-coupled devices; and,
      a first comparator, capacitor, and combination of switching circuitry to provide for continuity of the output of said first delay-line time expander during the delay flyback of said first charge-coupled device or said first tandem combination of charge-coupled devices, thus providing a time-expanded version of said information-bearing waveform; and,
   a delay line time compressor which requires only a time compression means and a cycle repetition means, said delay line time compressor consisting of:
      a second charge-coupled device or a second tandem combination of charge-coupled devices clocked as a second delay line at a variable rate governed by the output of a second sawtooth waveform generator whose repetition rate is the same as that of said first sawtooth waveform generator;
      a second switch for gating the bandwidth-compressed information-bearing waveform to said second charge-coupled device or said second tandem combination of charge-coupled devices; and,
      a second comparator and combination of switching circuitry to provide for continuity of the output of said second delay line time compressor during the delay flyback of said second charge-coupled device or said second tandem combination of charge-coupled devices; and,
   a cycle repetition means connected to the output of said second delay line time compressor providing an output in which each portion of the signal from said second delay line time compressor is repeated a plurality of times to reconstruct said information-bearing waveform.

2. A delay line time expander and a delay line time compressor, as described in claim 1, in which said cycle repetition means comprises a third charge-coupled device or a third tandem combination of charge-coupled devices, clocked as a delay line at the period of said second sawtooth waveform generator, said third charge-coupled device or tandem combination of charge-coupled devices having a plurality of taps equally spaced along the electrical length of said third charge-coupled device or said third tandem combination of charge-coupled devices, the waveforms from which taps enter a responsive third comparator which selects only the waveform of greatest amplitude, thus reconstructing said information-bearing waveform.

3. A delay line time compressor and a delay line time expander for compressing an information-bearing waveform into short time intervals, and subsequently expanding it to occupy a time span as long as the original span, comprising:

a delay line time compressor which requires only a time compression means and which consists of:
  a first charge-coupled device or a first tandem combination of charge-coupled device clocked as a first delay line at a variable rate governed by the output of a first sawtooth waveform generator,
  a first switch for gating said information-bearing waveform to said first charge-coupled device or said first tandem combination of charge-coupled devices; and,
  a first comparator and combination of switching circuitry to provide for continuity of the output of said first delay line time compressor during the delay flyback of said first charge-coupled device or said first tandem combination of charge-coupled devices thus providing a time-compressed version of said information-bearing waveform; and, a delay line time expander which requires only a time expansion means and which consists of:
  a second charge-coupled device or a second tandem combination of charge-coupled devices clocked as a second delay line at a variable rate governed by the output of a second sawtooth waveform generator whose repetition rate is the same as that of said first sawtooth waveform generator;
  a second switch for gating said information-bearing waveform to said second charge-coupled device or said second tandem combination of charge-coupled devices; and,
  a second comparator, a capacitor, and a second combination of switching circuitry to provide for continuity of the output of said second delay-line time expander during the delay flyback of said second charge-coupled device or said second tandem combination of charge-coupled devices, thus re-expanding said information bearing waveform to its original form.

* * * * *